United States Patent [19]
Gudelis et al.

[11] 4,213,253
[45] Jul. 22, 1980

[54] ELECTRONIC TEACHING AND TESTING DEVICE

[75] Inventors: Drasutis Gudelis, Cos Cob; David D. Vetrane, Shelton, both of Conn.

[73] Assignee: Nida Corporation

[21] Appl. No.: 914,564

[22] Filed: Jun. 12, 1978

[51] Int. Cl.$^2$ ............................................. G09B 23/18
[52] U.S. Cl. ................................................... 35/19 A
[58] Field of Search ...................... 35/10, 13, 19 A, 30; 312/333; 174/DIG. 9

[56] References Cited

U.S. PATENT DOCUMENTS

| | | | |
|---|---|---|---|
| 1,271,641 | 7/1918 | Werwath | 35/19 A |
| 2,893,137 | 7/1959 | Alling et al. | 35/19 A |
| 3,011,269 | 12/1961 | Thompson | 35/19 A |
| 3,071,876 | 1/1963 | Swanberg | 35/19 A |
| 3,277,589 | 10/1966 | Berdan et al. | 35/19 A |
| 3,344,535 | 10/1967 | Poesl | 35/19 A |
| 3,524,198 | 8/1970 | Malmstadt et al. | 35/19 A X |
| 4,091,550 | 5/1978 | Schrenk et al. | 35/19 A |
| 4,112,593 | 9/1978 | Hill et al. | 35/19 A |

*Primary Examiner*—Vance Y. Hum
*Attorney, Agent, or Firm*—Marius J. Jason

[57] ABSTRACT

A dual purpose electronic instrumentation device for teaching the principles of electricity and electronics and for testing electrical systems is disclosed which includes a housing, having electronic circuitry arranged within it with control, display and terminal elements extending externally of the housing. The housing is divided into at least two portions with a first portion being movable relative to the second portion to expose or conceal a display surface having a receptacle for receiving one or more plug-in circuit cards, wherein the control, display and terminal elements of the housing and the receptacle of the display surface are interconnected with the electronic circuitry for testing electrical systems which are electrically coupled to the terminal elements and the receptacle. When the display surface is concealed, the instrumentation device is for testing electrical devices electrically coupled to the terminal elements of the housing. When the display surface is exposed, the instrumentation device is for testing circuits provided on plug-in circuit cards received in the receptacle.

4 Claims, 3 Drawing Figures

ELECTRONIC TEACHING AND TESTING DEVICE

BACKGROUND OF THE INVENTION

The present invention relates to electronic instrumentation devices and more particularly to devices for teaching electronics and for testing electrical systems.

In order to perform electronic circuitry test and design experiments, a number of specialized electronic instruments are generally required, such as a variable power supply, a variable signal generator, an oscilloscope for observing the behavior of signals through a circuit being tested, meters for measuring resistance, voltage and current, and preferably an electronic counter for recording the input/output signal characteristics of the circuit being tested. These instruments are typically available as separate components and require a thorough understanding of their operating principles by users before they can be effectively utilized.

Furthermore, the use of component electronic instruments is generally limited to the laboratory or classroom. Experiments conducted away from the laboratory cannot be readily performed using separate components because more than one instrument has to be transported and set-up, which is burdensome and time-consuming. There is presently no portable, self-contained electronic instrumentation device for performing electronic circuitry test and design experiments that is suitable for use in a laboratory, a classroom, or in the home.

Moreover, when using separate electronic instruments it is difficult to set up a circuitry experiment because the circuit, even if on a printed circuit card, must be connected to the electronic instruments using external leads or wires. A beginning student who is not very familiar with the operation of the equipment can easily make mistakes in making the connections and cause possible equipment damage. Therefore, the use of separate electronic instruments requiring external leads for connecting the instruments to the circuit to be tested is undesirable in a classroom because it is time-consuming, mistakes can be made in setting up the experiment, and an experienced instructor is required to insure that the proper connections are made. Further, the time spent in setting up the experiment leaves less time available for actually conducting the experiment.

Because of the complexity involved in setting up electronic circuitry experiments utilizing specialized instruments, the use of laboratory instruments in schools for teaching purposes has not been wide spread and much less, if ever, has such equipment been made available for use and handling by students.

If separate components are used in schools, they are generally used with specially designed benches having lockable covers to prevent theft of the components when the equipment is not in use. Therefore, it is desirable to provide a self-contained electronic instrumentation device that does not require specially designed tables, but rather can be used on any table, and when the device is not in use, can be easily carried and stored in any lockable cabinet.

Another limitation of electronic component equipment for teaching purposes is that the equipment can only be used during classroom hours under guidance of an experienced instructor. The instruments are not portable and cannot be readily taken home by a student to be used with a training manual for self-teaching purposes. Therefore, it is desireable to provide a portable electronic instrumentation device which is simple to operate that a student can use without supervision so that the device can be taken home by the student and used with an instructional manual for self-teaching purposes.

Furthermore, the electronic instrumentation devices designed for use in teaching electronics that are presently available are not suitable for use as laboratory test instruments for conducting electronic circuitry test and design experiments. Such training devices are only useful in conducting a very limited number of educational experiments and are not useful as practical laboratory instruments for advanced students. Therefore it is desirable to have a dual purpose instrumentation device suitable for use as a trainer and as a laboratory test instrument in order to provide a student with a practical state of the art laboratory instrument.

OBJECTS OF THE INVENTION

It is an object of the present invention to provide a portable electronic instrumentation device that can be used as a teaching device as well as a laboratory instrument.

It is another object of the present invention to provide a self-contained electronic instrumentation device having built-in test instruments, power supplies and electrical loads for the performance of most electronic test and design experiments.

It is a further object of the present invention to provide an electronic instrumentation device for receiving plug-in circuit cards bearing various circuit arrangements which can be tested, analyzed and experimented with using the built-in test instruments, power supplies and electrical loads of the instrumentation device without the use of external leads.

SUMMARY OF THE INVENTION

Briefly, the present invention relates to a portable, self-contained electronic instrumentation device suitable for testing electrical systems and for use as an electronic training device. The device has a housing enclosing electronic circuitry therein with control, display and terminal elements extending externally of the housing. The housing is divided into two portions with a first portion being movable relative to the second portion to expose or conceal a display surface having a receptacle therein for receiving a circuit card. Preferably, the movable portion is a drawer slidably arranged to move from a closed position within the housing to an open position to expose the display surface and the receptacle for receiving plug-in circuit cards. When the display surface is exposed, circuit cards bearing various circuit arrangements can be inserted into the receptacle, tested and analyzed without the use of additional electronic test equipment, as all the circuitry necessary for experimenting with the circuit card is provided by the electronic instrumentation device. Printed cards bearing various circuit arrangements can be inserted into the receptacle, analyzed and experimented with. In addition, breadboard circuit cards can be inserted into the receptacle and circuits constructed and tested using all of the built-in capabilities of the instrumentation device without the use of external leads and the need for additional test equipment. When the drawer is in closed position, the instrumentation device is compact and portable. However, the instrumentation device is still available for use as a laboratory test instrument for testing and trouble-shooting other equipment using the control, display and connector elements located on the outer surface of the housing.

Other objects, aspects and advantages of the invention will become apparent on reading the following detailed description and upon reference to the accompanying drawings.

BRIEF DESCRIPTION OF THE DRAWINGS

The preferred embodiment of the present invention is illustrated in the drawings, which should not be construed in a limiting sense, as follows.

DETAILED DESCRIPTION OF THE PREFERRED EMBODIMENT

Figure 1:
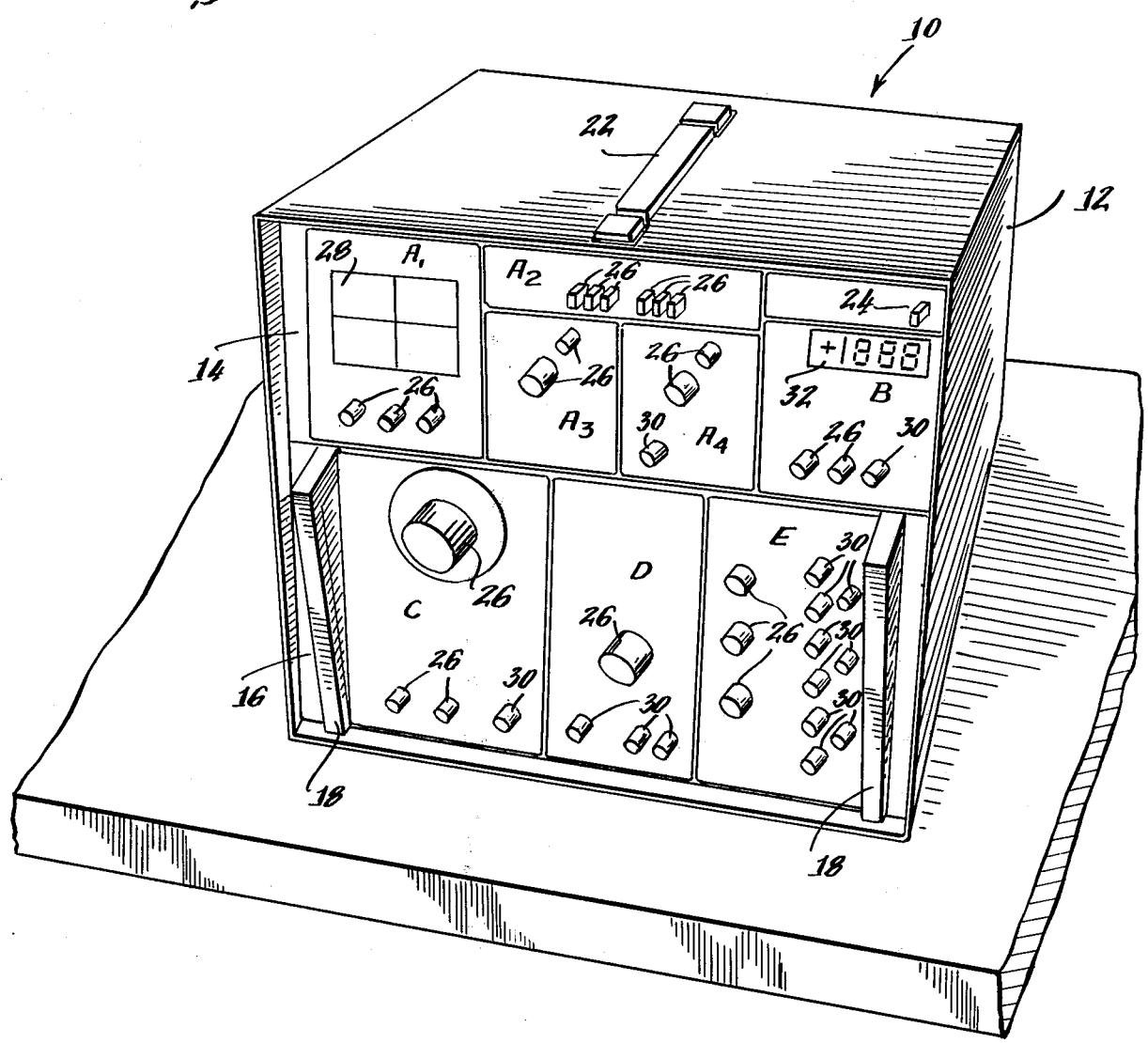
FIG. 1 is a perspective view of the instrumentation device.

Referring to the drawings and first to FIG. 1, there is shown a dual purpose electronic instrumentation device 10 designed for teaching the principles of electricity and electronics and testing external electrical systems (not shown). The device includes a housing 12 having an upper front panel 14 and a movable lower front panel 16. Lower front panel 16 is the front surface of a drawer 34, shown in FIG. 2. The drawer 34 is withdrawn from the interior of the housing 12 by exerting a force on handles 18. Affixed to the top of the housing 12 is a handle 22 which allows a person to easily carry the instrumentation device from place to place where its use is desired.

Contained within the housing 12 is conventional electronic circuitry (not shown) having control elements 26, display elements 28 and 32 and terminal elements 30 extending through the front panels 14 and 16 to provide a versatile electronic instrumentation device for testing and trouble-shooting electrical devices electrically coupled to the terminal elements 30 of the instrumentation device 10 by means of conventional external leads or wires (not shown). On-off switch 24 controls the application of primary power to the entire instrumentation device.

The control elements 26, display elements 28 and 32 and connector elements 30 of the front panels 14 and 16 are associated with various instrument sections of the instrumentation device for testing electrical systems. The instrument sections of the instrumentation device 10 include an oscilloscope instrument Section $A_1$ and associated conventional trigger $A_2$, conventional horizontal $A_3$, and conventional vertical $A_4$ control sections for providing a visual indication of an electrical signal in a circuit being tested on the cathode ray tube display 28. Instrument section B measures and records resistance, voltage or current on the multimeter display 32 by employing conventional voltage, current and impedance measuring circuitry. The multimeter display 32 can be a digital display as shown or an analogue display. Instrument section C uses a conventional signal generator for providing analogue or digital wave forms to a circuit being tested. Instrument section D is a conventional power supply for AC power and instrument section E is a conventional power supply for DC power. These instrument sections comprise the basic electronic instruments for testing, analyzing and trouble-shooting most electrical systems.

It should be noted that these instrument sections can be rearranged as desired and instruments can be added to or subtracted from the instrumentation device without departing from the scope of the invention.

Figure 2:
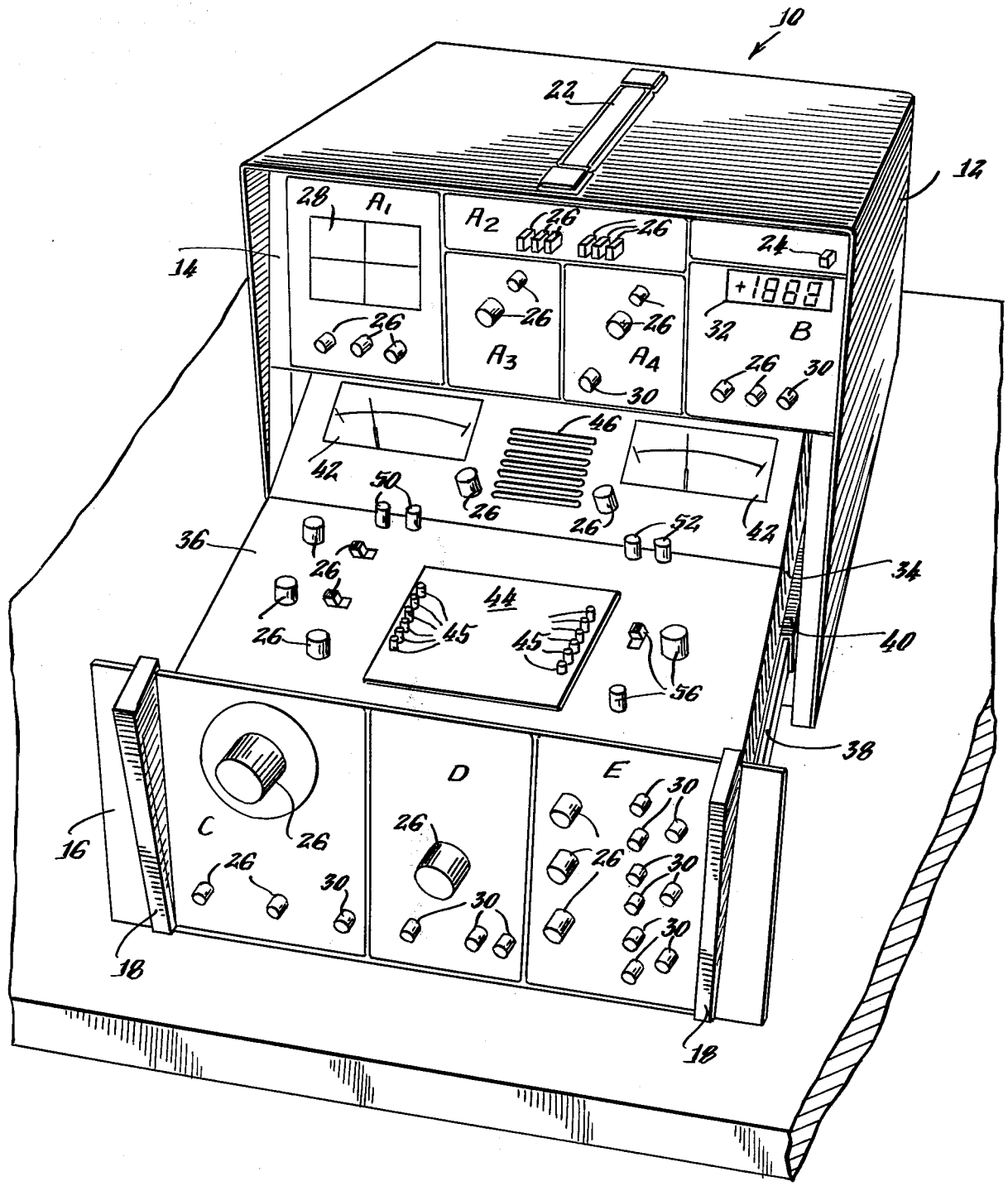
FIG. 2 is perspective view of the instrumentation device with its slidable drawer exposed in an open position.

FIG. 2 shows the drawer 34 in its open position withdrawn from the interior of the housing 12 to expose a display surface 36. The drawer is slidably supported in a conventional manner within the housing 12, which in this particular embodiment includes channel members 38 affixed to the opposing sides of the drawer which engage with supporting members 40 attached to the interior side walls of the housing 12, such that the drawer 34 may be slidably withdrawn from the housing when required and restored within the housing when not required by exerting a force on the handles 18.

The display panel 36 of the drawer 34 includes a receptacle 44 having terminals 45 for receiving a plug-in circuit card (not shown). In addition, mounted on the display surface 36 are various control elements 26 and 56, display elements 42 and terminal elements 50 and 52 which are interconnected with the receptacle 44 and the electronic circuitry contained in the housing for selecting the power, signal and load to be applied to the circuits on the circuit cards plugged into the receptacle 44 to provide a versatile experimentation teaching system. A conventional loudspeaker microphone 46 mounted on the display surface 36 is also connected with the internal circuitry of the device to allow a student to hear electrical signals or create electrical signals from audio sound. Additional receptacles for additional circuit cards can also be provided on the display surface 36 for even greater versatility in experimenting with intergrated circuits.

With the drawer 34 in open position, all of the built-in instrument sections of the instrumentation device 10 are available for use for experimenting with printed circuit cards plugged into the receptacle 44 without having to use external leads, as all of the signals and power generated by the instrument sections of the instrumentation device are fed to the printed circuit card through the receptacle 44. In addition, blank circuit cards may be inserted and circuits can be designed, analyzed and tested without the use of external leads or the need for any additional instruments.

When the drawer 34 is in closed position, the instrumentation device is made compact for easy transport. Moreover, the instrumentation device with the exposed control, display and terminal elements of the front panels 14 and 16 is a practical laboratory instrument for testing and trouble-shooting electrical devices connected to the device with external conductive leads.

Figure 3:
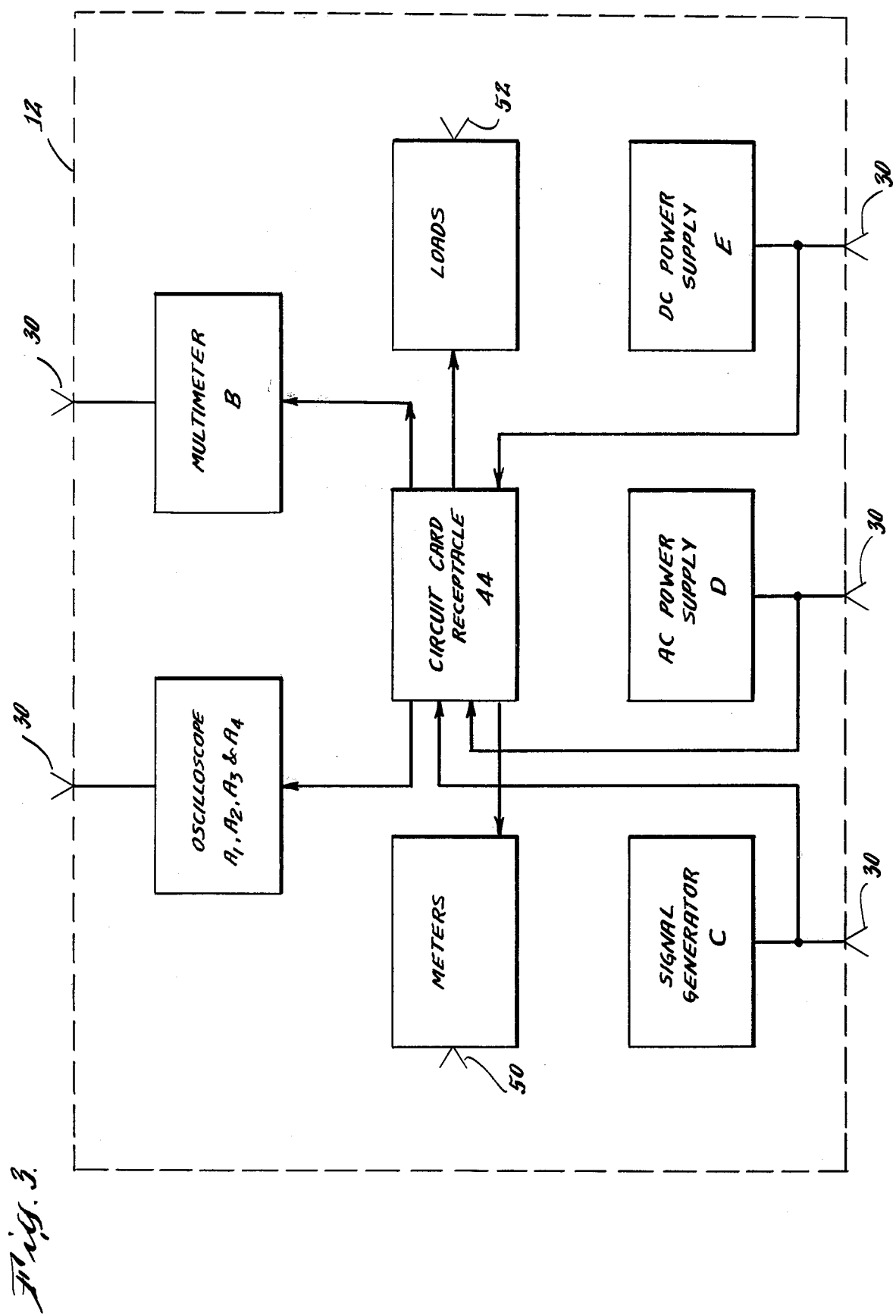
FIG. 3 is a block diagram of the electronic circuitry.

Referring to FIG. 3, the internal circuitry of the instrumentation device 10 is shown in block diagram. The housing 12 is shown in dotted outline and the terminal elements 30 extending externally of the housing 12 and the terminal elements 50 and 52 extending externally of the drawer 34 are shown as carets. The individual instrument sections $A_1$, $A_2$, $A_3$, $A_4$, B, C, D, and E as well as circuit card receptacle 44 are shown with their interconnections by solid lines. The block labeled "Meters" represents conventional analogue metering circuits associated with the display elements 42 shown in FIG. 2 mounted on the drawer 34 for measuring current, voltage and resistance of a circuit provided on a circuit card plugged into the receptacle 44. The terminal elements 50 of the drawer 34 provide coupling for external metering if metering different from that already provided by the instrumentation device is desired. The block labeled "Loads" represents an internal variable resistor for applying load to the output of a circuit of a circuit card plugged into the receptacle 44, the load being adjustable by means of control elements 56 shown in FIG. 2, with the terminal elements 52 of the drawer 34 being output access points for monitoring output signals or applying external load.

The oscilloscope $A_1$, $A_2$, $A_3$ and $A_4$, signal generator C, multimeter B, a.c. power supply D, and d.c. power supply E are connected to the terminal elements 30 for monitoring load attached to the terminal elements or applying signals and power thereto. The receptacle 44 receives input signals and power from the signal generator C, the a.c. power supply D, the d.c. power supply E and provides output signals to the built-in "Meters" and the external meters coupled to the terminal elements 50, and the built-in "Loads," and the loads coupled to the terminal elements 52, the multimeter B and the oscilloscope $A_1$, $A_2$, $A_3$ and $A_4$.

It should be understood by those skilled in the art that various modifications may be made in the present invention without departing from the spirit and scope thereof as described in the specification and defined in the amended claims.

What is claimed is:

1. A portable, self-contained, dual function electronic instrumentation device for teaching the principles of electricity and electronics and as a laboratory test instrument for testing electrical systems, comprising:

a housing; control, display and terminal elements extending externally of said housing; electrical circuit means arranged within said housing and electrically coupled to said control, display and terminal elements for transmitting electrical signals thereto; said housing having an exterior surface with at least some of said control, display and terminal elements extending outwardly therefrom, said exterior surface having a movable portion and a fixed portion; said movable portion being mechanically coupled to a normally concealed display surface having second display and control elements so that said display surface is exposed when said movable portion is moved relative to said fixed portion; said display surface having a receptacle with circuit card receiving means thereon for direct electrical coupling to a circuit card without the use of conductive wires when said display surface is exposed; said control, display and terminal elements of said housing with said second display elements, said second control elements and said receptacle of said display surface being interconnected with said electrical circuit means so that when said display surface and receptacle is concealed, electrical devices may be tested by electrically coupling an electrical device to said terminal elements by means of external conductive leads, and when said display surface and receptacle is exposed, a circuit card may be electrically coupled to said receptacle for teaching the principles of electricity and electronics by way of the various display and control elements without use of external conductive leads.

2. The device as recited in claim 1, wherein: said movable first portion is the exterior surface of a drawer, said drawer being slidably arranged to move from a closed position within the housing to an open position to expose said display surface and receptacle.

3. The device as recited in claim 1, wherein said display surface includes additional terminal elements interconnected with said electrical circuit means and said receptacle.

4. In a portable, self-contained, electronic instrumentation device for teaching the principles of electricity and electronics having a housing enclosing electrical circuit means therein and control, display and terminal elements extending externally of the housing, the improvement wherein the housing is divided into a first and second portion, said first portion being fixed in place and the second portion forming a drawer for slidably moving from a closed position to an open position relative to said first portion, said drawer having a work surface which is concealed when said drawer is closed and exposed when said drawer is opened, said work surface of said drawer having second control and display elements and a receptacle adapted for receiving a plug-in circuit card therein, the control, display and terminal elements of the housing with said second control and display elements and said receptacle of said work surface being interconnected with the electrical circuit means for testing circuits provided on the circuit card plugged into said receptacle without the use of external conductive leads when said work surface is exposed, and said exterally extending control and display being adapted to test electrical devices coupled to the terminal elements of said housing with the use of external conductive leads when said drawer is closed and said work surface is concealed.

* * * * *